(12) United States Patent
Suzuki et al.

(10) Patent No.: US 12,564,279 B2
(45) Date of Patent: Mar. 3, 2026

(54) LID

(71) Applicant: Daiwa Can Company, Tokyo (JP)

(72) Inventors: Ken Suzuki, Sagamihara (JP); Jun Shibata, Sagamihara (JP); Ayako Inumaru, Sagamihara (JP); Kyoko Suganuma, Sagamihara (JP)

(73) Assignee: DAIWA CAN COMPANY, Tokyo (JP)

( * ) Notice: Subject to any disclaimer, the term of this patent is extended or adjusted under 35 U.S.C. 154(b) by 479 days.

(21) Appl. No.: 18/059,526

(22) Filed: Nov. 29, 2022

(65) Prior Publication Data

US 2023/0097812 A1     Mar. 30, 2023

Related U.S. Application Data

(63) Continuation of application No. PCT/JP2021/013917, filed on Mar. 31, 2021.

(30) Foreign Application Priority Data

May 29, 2020     (JP) ................................. 2020-094467

(51) Int. Cl.
*A47G 19/22*          (2006.01)
*B65D 47/06*          (2006.01)
(Continued)

(52) U.S. Cl.
CPC ............. *A47G 19/22* (2013.01); *B65D 47/06* (2013.01); *B65D 65/46* (2013.01); *C08L 67/02* (2013.01); *C08L 67/04* (2013.01); *C08L 2201/06* (2013.01)

(58) Field of Classification Search
CPC .................... B65D 47/06; B65D 65/46; B65D 2543/00092; B65D 43/0212; B65D 2543/00046; B65D 2543/00638; B65D 2543/00685; B65D 2543/00296; B65D 2543/00805; B65D 2543/00731;
(Continued)

(56) References Cited

U.S. PATENT DOCUMENTS

2005/0043462 A1     2/2005   Yamada et al.
2008/0128382 A1*    6/2008   Yamamoto ......... B65D 47/0814
                                                                          215/236
(Continued)

FOREIGN PATENT DOCUMENTS

JP          H0664581 U      9/1994
JP          H09-57849 A     3/1997
(Continued)

OTHER PUBLICATIONS

International Preliminary Report on Patentability dated Dec. 8, 2022 in connection with International Application No. PCT/JP2021/013917.
(Continued)

*Primary Examiner* — Michael C Miggins
(74) *Attorney, Agent, or Firm* — John P. White

(57)     ABSTRACT

A lid for covering a cup-shaped drinking container, a resin forming the lid being a biodegradable resin, 50% by mass or more of the biodegradable resin having a deflection temperature under load of 80° C. or more, 5% by mass or more of the biodegradable resin having a flexural elastic modulus of 3000 MPa or more.

15 Claims, 3 Drawing Sheets

(51) Int. Cl.
    B65D 65/46        (2006.01)
    C08L 67/02        (2006.01)
    C08L 67/04        (2006.01)

(58) Field of Classification Search
    CPC ........ B65D 65/466; B65D 3/00; A47G 19/22;
               C08L 67/04; C08L 67/02; C08L 2201/06;
                                   Y02W 90/10
    See application file for complete search history.

(56) References Cited

U.S. PATENT DOCUMENTS

| | | | |
|---|---|---|---|
| 2009/0206080 A1* | 8/2009 | Ribi | B65D 43/0202 |
| | | | 220/212 |
| 2010/0258564 A1 | 10/2010 | Sarson | |
| 2018/0134465 A1* | 5/2018 | Kuo | B65D 43/0222 |

FOREIGN PATENT DOCUMENTS

| | | |
|---|---|---|
| JP | H09-057849 A | 3/1997 |
| JP | H11-172091 A | 6/1999 |
| JP | 2004-231212 A | 8/2004 |
| JP | 2005-313998 A | 11/2005 |
| JP | 2007-145423 A | 6/2007 |
| JP | 2008-055694 A | 3/2008 |
| JP | 2012-520805 A | 9/2012 |
| WO | WO 2003/022927 A1 | 3/2003 |

OTHER PUBLICATIONS

Japanese official action dated Jan. 16, 2024 in connection with corresponding Japanese Patent Application No. 2020-094467.

Taiwanese official action dated Aug. 19, 2024 in connection with corresponding Taiwanese Patent Application No. 110112476.

Japanese official action dated May 7, 2024 in connection with corresponding Japanese Patent Application No. 2020-094467.

International Search Report issued Jun. 22, 2021 in connection with PCT International Application No. PCT/JP2021/013917, with English Translation Included.

Japanese official action dated Sep. 3, 2024 in connection with corresponding Japanese Patent Application No. 2020-094467.

* cited by examiner

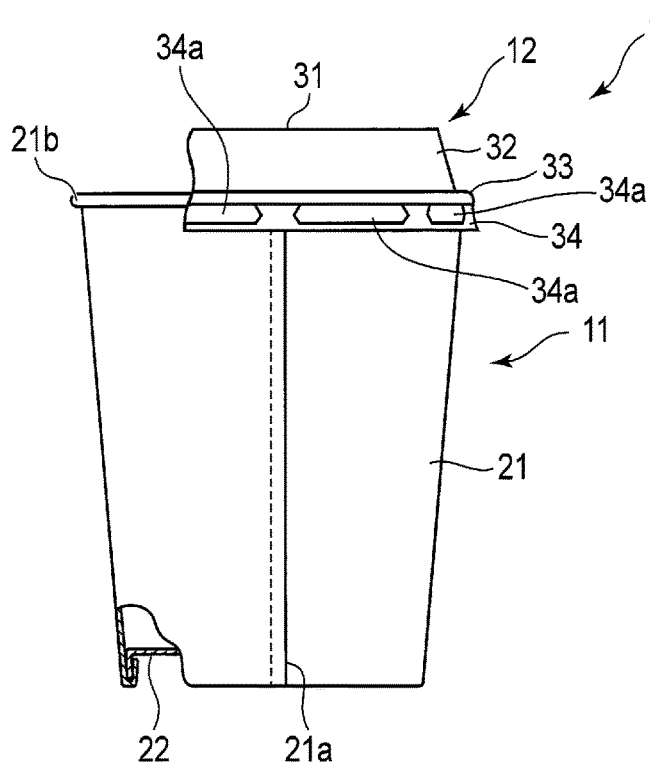
F I G. 1
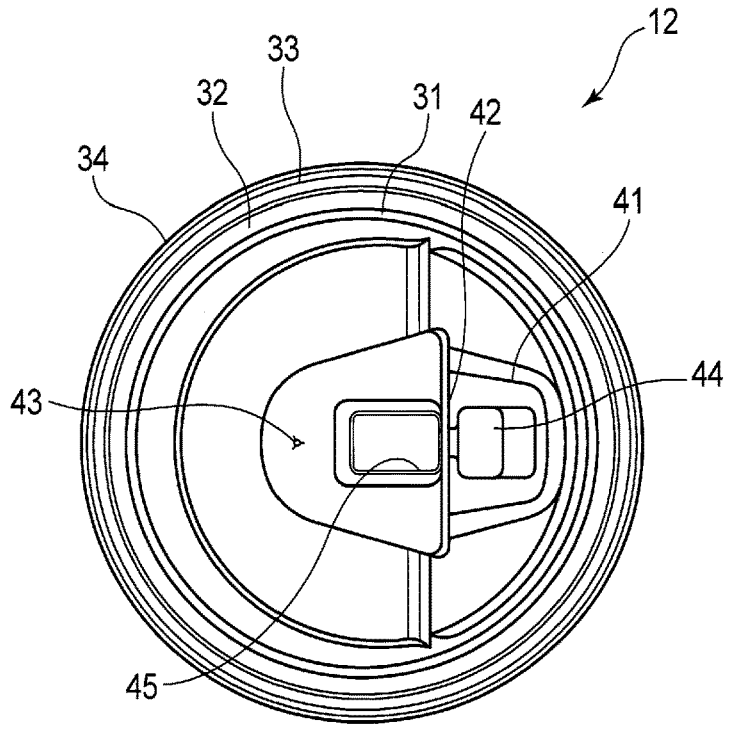
F I G. 2

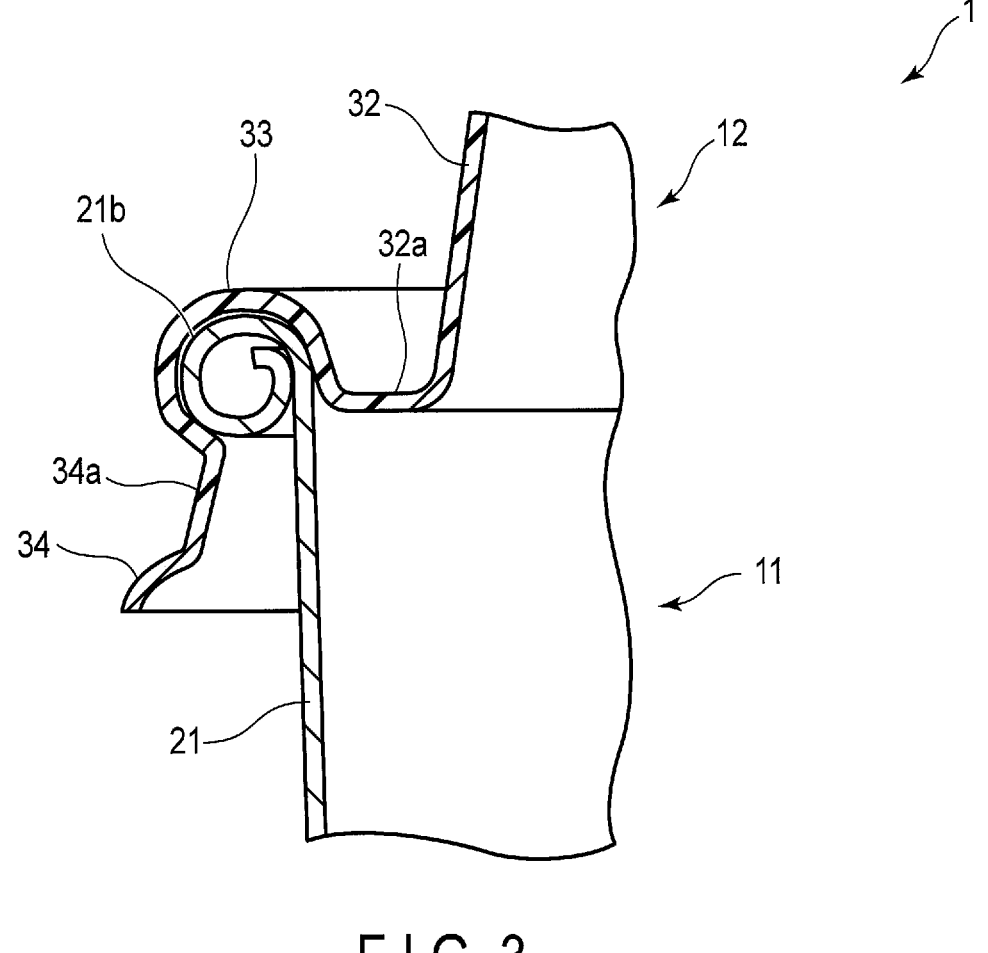
F I G. 3

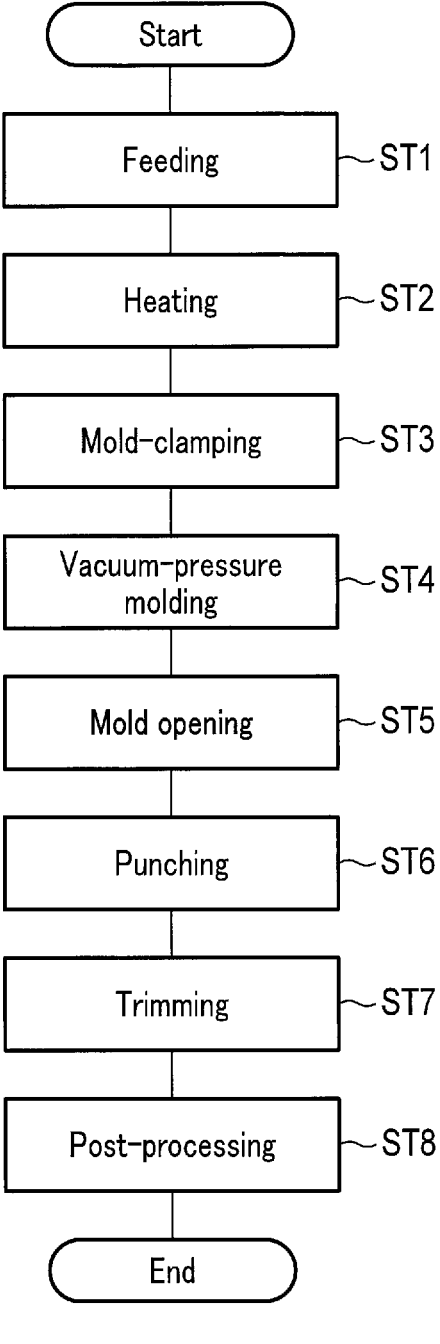
F I G. 4

LID

CROSS-REFERENCE TO RELATED APPLICATIONS

This application is a Continuation application of PCT Application No. PCT/JP2021/013917 filed Mar. 31, 2021 and based upon and claiming the benefit of priority from Japanese Patent Application No. 2020-094467 filed May 29, 2020, the entire contents of which are incorporated herein by reference.

FIELD

The present invention relates to a lid for covering a cup-shaped drinking container.

BACKGROUND

A cup-shaped drinking container is covered with a lid so that a beverage contained in the drinking container does not spill out or dust or dirt in the air does not enter the drinking container when the beverage is brought back from a shop of purchase. For example, Patent Literature 1 discloses improving the shape of such a lid to prevent a beverage from spilling out when the beverage is consumed and before and after the beverage is consumed.

CITATION LIST

Patent Literature

Patent Literature 1: Jpn. UM Appln. KOKAI Publication No. H6-64581

SUMMARY

Technical Problem

A conventional lid for covering a cup-shaped drinking container is formed from a non-biodegradable resin such as high-impact polystyrene (HIPS), as also described in Patent Literature 1. The inventors of the present invention, from the standpoint of environmental protection, worked to develop a lid formed from a biodegradable resin; however, when a biodegradable resin was used, it was difficult to satisfy multiple qualities required for the lid all at once.

A first important quality required for the lid is that it has shape stability against hot beverages such as hot coffee and tea. Another important quality required for the lid is that it does not deform even when it is attached and detached in order to add milk or sugar to a beverage, for example. Accordingly, an object of the present invention is to provide a lid formed from a biodegradable resin and having excellent shape stability against heat and attaching and detaching operations.

Solution to Problem

According to an embodiment of the present invention, there is provided a lid for covering a cup-shaped drinking container, a resin forming the lid being a biodegradable resin, 50% by mass or more of the biodegradable resin having a deflection temperature under load of 80° C. or more, 5% by mass or more of the biodegradable resin having a flexural elastic modulus of 3000 MPa or more.

Advantageous Effects of Invention

According to the present invention, it is possible to provide a lid formed from a biodegradable resin and having excellent shape stability against heat and attaching and detaching operations.

BRIEF DESCRIPTION OF THE DRAWINGS

FIG. 1 is a side view showing a state in which a cup-shaped container body is covered with a lid according to an embodiment of the present invention.

FIG. 2 is a plan view showing a structure of the lid.

FIG. 3 is an enlarged cross-sectional view showing a fitting portion between the lid and the container body.

FIG. 4 is a flowchart showing an example of a method for manufacturing the lid.

DETAILED DESCRIPTION

Hereinafter, the present invention will be described; however, the description below is intended to provide a detailed description of the present invention, and is not intended to limit the present invention.

1. Lid Material

A lid is a lid for covering a cup-shaped drinking container, and may be used as a lid of a container containing a hot beverage or a lid of a container containing a cold beverage.

The lid is characterized as being formed from a biodegradable resin. That is, the lid contains a biodegradable resin as a main component, and may contain an additive as necessary.

50% by mass or more of the biodegradable resin has a deflection temperature under load of 80° C. or more, and 5% by mass or more of the biodegradable resin has a flexural elastic modulus of 3000 MPa or more. Herein, the upper limit of the deflection temperature under load is, for example, 120° C. The upper limit of the flexural elastic modulus is, for example, 6000 MPa.

If 50% by mass or more of the biodegradable resin has a deflection temperature under load of 80° C. or more, the lid is less likely to be deformed even when it is exposed to a high temperature, leading to improved shape stability against heat. If 5% by mass or more of the biodegradable resin has a flexural elastic modulus of 3000 MPa or more, the rigidity of the lid is increased, leading to improved shape stability against the attaching and detaching operations. The shape stability of the lid is an important quality required for the lid because it is responsible for leakage of a beverage from a fitting portion between the lid and the container body, which occurs when the container containing the beverage is carried or when the beverage is consumed.

A resin having a deflection temperature under load of 80° C. or more accounts for 50% by mass or more of the biodegradable resin forming the lid, and it preferably accounts for 55% by mass or more, more preferably accounts for 60% by mass or more, and still more preferably accounts for 65% by mass or more of the biodegradable resin. A resin having a flexural elastic modulus of 3000 MPa or more accounts for 5% by mass or more of the biodegradable resin forming the lid, and it preferably accounts for 10% by mass or more of the biodegradable resin.

The biodegradable resin may be formed from one type of resin, but is preferably formed from multiple types of resins since the types and properties of commercially available biodegradable resins are limited as compared with non-biodegradable resins.

If the biodegradable resin is formed from one type of resin, this one type of resin has both a deflection temperature under load of 80° C. or more and a flexural elastic modulus of 3000 MPa or more. On the other hand, if the biodegradable resin is formed from multiple types of resins, one of the multiple types of resins has a deflection temperature under load of 80° C. or more, and another resin has a flexural elastic modulus of 3000 MPa or more. Examples of the resin having a deflection temperature under load of 80° C. or more include polybutylene succinate (PBS). For example, FZ91PM (PTT MCC Biochem Co., Ltd.), or the like can be used as PBS. Examples of the resin having a flexural elastic modulus of 3000 MPa or more include polylactic acid (PLA). For example, Ingeo 2003D (NatureWorks), Luminy L175 (Total Corbion PLA), REVODE101 (Zhejiang Hisun Biomaterials), TERRAMAC TP-4000 (UNITIKA LTD.), or the like can be used as PLA.

The biodegradable resin is preferably formed from multiple types of resins, for example two or three types of resins. If the biodegradable resin is formed from multiple types of resins, a resin that satisfies intended physical properties (i.e., deflection temperature under load and flexural elastic modulus) can be easily obtained, and a resin composition can be easily designed.

That is, in a preferred embodiment, the biodegradable resin includes a first resin having a deflection temperature under load of 80° C. or more and a second resin having a flexural elastic modulus of 3000 MPa or more, a proportion of the first resin in the biodegradable resin being in a range of 50 to 95% by mass, and a proportion of the second resin in the biodegradable resin being in a range of 5 to 50% by mass. Herein, the first resin and the second resin are different types of resins. In this embodiment, the biodegradable resin may be formed from only the first resin and the second resin, or may further include a biodegradable resin of a type different from the first resin and the second resin.

In a more preferred embodiment, the biodegradable resin includes a first resin having a deflection temperature under load of 80° C. or more and a flexural elastic modulus of less than 3000 MPa, and a second resin having a flexural elastic modulus of 3000 MPa or more and a deflection temperature under load of less than 80° C., a proportion of the first resin in the biodegradable resin being in a range of 50 to 95% by mass, and a proportion of the second resin in the biodegradable resin being in a range of 5 to 50% by mass. Herein, the first resin and the second resin are different types of resins. In this embodiment, the biodegradable resin may be formed of only the first resin and the second resin, or may further include a biodegradable resin of a type different from the first resin and the second resin.

The biodegradable resin is more preferably formed from two types of resins. That is, in a more preferred embodiment, the biodegradable resin is formed from two types of resins, a first resin having a deflection temperature under load of 80° C. or more and a second resin having a flexural elastic modulus of 3000 MPa or more, a proportion of the first resin in the biodegradable resin being in a range of 50 to 95% by mass, and a proportion of the second resin in the biodegradable resin being in a range of 5 to 50% by mass. Herein, the first resin and the second resin are different types of resins. In a still more preferred embodiment, the biodegradable resin is formed from two types of resins, a first resin having a deflection temperature under load of 80° C. or more and a flexural elastic modulus of less than 3000 MPa, and a second resin having a flexural elastic modulus of 3000 MPa or more and a deflection temperature under load of less than 80° C., a proportion of the first resin in the biodegradable resin being in a range of 50 to 95% by mass, and a proportion of the second resin in the biodegradable resin being in a range of 5 to 50% by mass. Herein, the first resin and the second resin are different types of resins.

In all of the above-described preferred embodiments, the upper limit of the deflection temperature under load of the first resin is, for example, 120° C., and the deflection temperature under load of the first resin is preferably 80 to 120° C., more preferably 90 to 120° C., still more preferably 90 to 110° C., and still more preferably 90 to 100° C. In all of the above-described preferred embodiments, the flexural elastic modulus of the first resin is, for example, 400 MPa or more and less than 3000 MPa. In all of the above-described preferred embodiments, the upper limit of the flexural elastic modulus of the second resin is, for example, 6000 MPa, and the flexural elastic modulus of the second resin is preferably 3000 to 6000 MPa, more preferably 3000 to 5000 MPa, and still more preferably 3000 to 4000 MPa. The deflection temperature under load of the second resin is, for example, 40° C. or more and less than 80° C.

In all of the above-described preferred embodiments, it is more preferable that a proportion of the first resin in the biodegradable resin be 55 to 95% by mass, and that a proportion of the second resin in the biodegradable resin be 5 to 45% by mass. Still more preferably, a proportion of the first resin in the biodegradable resin is 60 to 95% by mass, and a proportion of the second resin in the biodegradable resin is 5 to 40% by mass. Still more preferably, a proportion of the first resin in the biodegradable resin is 65 to 95% by mass, and a proportion of the second resin in the biodegradable resin is 5 to 35% by mass.

In all of the above-described preferred embodiments, it is still more preferable that a proportion of the first resin in the biodegradable resin be 50 to 90% by mass, and that a proportion of the second resin in the biodegradable resin be 10 to 50% by mass. Still more preferably, a proportion of the first resin in the biodegradable resin is 55 to 90% by mass, and a proportion of the second resin in the biodegradable resin is 10 to 45% by mass. Still more preferably, a proportion of the first resin in the biodegradable resin is 60 to 90% by mass, and a proportion of the second resin in the biodegradable resin is 10 to 40% by mass. Still more preferably, a proportion of the first resin in the biodegradable resin is 65 to 90% by mass, and a proportion of the second resin in the biodegradable resin is 10 to 35% by mass.

As described above, the first resin has a deflection temperature under load of 80° C. or more, and preferably has a deflection temperature under load of 80° C. or more and a flexural elastic modulus of less than 3000 MPa. Examples of the first resin (i.e., a resin having a deflection temperature under load of 80° C. or more and a flexural elastic modulus of less than 3000 MPa) include polybutylene succinate (PBS) and poly(hydroxybutyrate/hydroxyhexanoate) (PHBH). For example, BioPBS FZ91PM (PTT MCC Biochem Co., Ltd.) or the like can be used as PBS. For example, AONILEX X131A (KANEKA CORPORATION), AONILEX X151A (KANEKA CORPORATION), or the like can be used as PHBH. The first resin is preferably polybutylene succinate (PBS).

As described above, the second resin has a flexural elastic modulus of 3000 MPa or more, and preferably has a flexural elastic modulus of 3000 MPa or more and a deflection temperature under load of less than 80° C. Examples of the second resin (i.e., a resin having a flexural elastic modulus of 3000 MPa or more and a deflection temperature under load of less than 80° C.) include polylactic acid (PLA). For example, Ingeo 2003D (NatureWorks), Luminy L175 (Total Corbion PLA), REVODE101 (Zhejiang Hisun Biomaterials), TERRAMAC TP-4000 (UNITIKA LTD.), or the like can be used as PLA. The second resin is preferably poly-lactic acid (PLA).

The first resin preferably has a tensile breaking elongation of 20% or more. That is, the first resin preferably has a deflection temperature under load of 80° C. or more and a tensile breaking elongation of 20% or more. The upper limit of the tensile breaking elongation of the first resin is, for example, 1000%. If the first resin has a tensile breaking elongation of 20% or more, the bending resistance of a hinge portion constituting a drinking spout that can be repeatedly opened and closed can be enhanced, whereby the durability of the hinge portion can be improved. Examples of the first resin (i.e., a resin having a deflection temperature under load of 80° C. or more and a tensile breaking elongation of 20% or more) include polybutylene succinate (PBS) and poly (hydroxybutyrate/hydroxyhexanoate) (PHBH).

The tensile breaking elongation of the first resin is more preferably 50% or more, still more preferably 100% or more, still more preferably 150% or more, still more preferably 200% or more, still more preferably 300% or more, still more preferably 400% or more, and still more preferably 500% or more. That is, the tensile breaking elongation of the first resin is more preferably 50 to 1000%, still more preferably 100 to 1000%, still more preferably 150 to 1000%, still more preferably 200 to 1000%, still more preferably 300 to 1000%, still more preferably 400 to 1000%, and still more preferably 500 to 1000%. Examples of the resin having a deflection temperature under load of 80° C. or more and a tensile breaking elongation of 50% or more include polybutylene succinate (PBS) and poly(hydroxybutyrate/hydroxyhexanoate) (PHBH). Examples of the resin having a deflection temperature under load of 80° C. or more and a tensile breaking elongation of 100% or more include polybutylene succinate (PBS). Examples of the resin having a deflection temperature under load of 80° C. or more and a tensile breaking elongation of 500% or more include polybutylene succinate (PBS). The tensile breaking elongation of the second resin is not particularly limited, and may be 20% or more or less than 20%.

The physical properties of the resin, that is, the deflection temperature under load, the flexural elastic modulus, and the tensile breaking elongation of the resin, can be adjusted by changing the molecular weight of the resin, by using a branching agent or a chain extender, or by changing the ratio of optical isomers, if any.

The "deflection temperature under load" represents a temperature at which the magnitude of the deflection reaches a constant value when the temperature of a sample is increased with a load of 0.45 MPa applied. The deflection temperature under load refers to a value measured in accordance with JIS K7191-1:2015. The "flexural elastic modulus" represents a bending load at which a sample to which the bending load is applied breaks. The flexural elastic modulus refers to a value measured in accordance with JIS K7171:2016. The "tensile breaking elongation" represents a tensile elongation occurring when a sample is pulled and breaks. The tensile breaking elongation refers to a value measured in accordance with JIS K7161-1:2014.

The tensile breaking elongation is calculated by the following expression:

$$\text{Tensile breaking elongation (\%)} = \{(L-L_0)/L_0\} \times 100$$

L=Length of sample at break
$L_0$=Length of sample before test

The lid may include an additive as necessary in addition to the biodegradable resin. Various additives known as additives for resins can be used as the additive. Examples of the additive include an antioxidant, an ultraviolet stabilizer, a weather resistant agent, an antistatic agent, a filler, a crystal nucleating agent, a lubricant, a release agent, a coloring pigment, a matting agent, a coloring inhibitor, an antifogging agent, and a flame retardant. These additives may be used alone or in combination of two or more thereof.

The additives may be added in an amount that does not impair the effects of the present invention. The total amount of the additives may be, for example, less than 50% by mass, preferably 1% by mass or more and less than 50% by mass in the final product (lid). The total amount of organic additives can be, for example, less than 5% by mass in the final product (lid). The amount of each organic additive added can be, for example, less than 1% by mass in the final product (lid).

Among the additives, a filler is preferably used. Preferably, an inorganic filler such as calcium carbonate, talc, silica, or the like can be used as the filler. More preferably, talc can be used as the filler. The particle size of the filler is not particularly limited; however, the average particle size thereof is, for example, 0.1 to 50 μm. Herein, the average particle size refers to a value measured by a laser diffraction scattering method. If a filler is used, the heat resistance and strength of the lid can be improved, and drawdown during molding can be suppressed.

The total amount of the filler can be, for example, less than 40% by mass, preferably 1% by mass or more and less than 40% by mass in the final product (lid). The lid may also include a recycled material.

The lid is used by being detachably fitted onto the container body. A known container body that is detachably fitted to a lid can be used as the container body. The container body may be formed from, for example, a paper base material or a resin such as a biodegradable resin, and is preferably formed from a paper base material.

2. Lid Structure

The lid is usually formed of a disk-shaped top plate portion and a cylindrical portion continuous with the outer peripheral edge of the top plate portion. One end of the cylindrical portion is continuous with the top plate portion, and the other end of the cylindrical portion forms a circular opening end. The lid has, for example, the following dimensions. The inner diameter of the opening end is, for example, 60 to 100 mm, the diameter of the top plate portion is, for example, 60 to 100 mm, and the height of the cylindrical portion is, for example, 5 to 50 mm.

The lid preferably has a thickness of 0.03 mm or more in all portions thereof. That is, the lid preferably has a thickness of at least 0.03 mm in its thinnest portion. It is preferable that the lid have a thickness of 0.03 mm or more in all portions thereof from the viewpoint of strength, that is, shape stability. The lid more preferably has a thickness of 0.03 to 0.50 mm in all portions thereof. The lid still more preferably has a thickness of 0.03 to 0.45 mm in all portions thereof.

The lid preferably has a mechanism that can be repeatedly opened and closed by a hinge portion provided on the top plate portion. The mechanism that can be repeatedly opened and closed forms a drinking spout. Thus, the mechanism that can be repeatedly opened and closed has a size suitable as a drinking spout. An example of the mechanism that can be repeatedly opened and closed is shown as a score 41 and a hinge portion 42 in FIG. 2 and will be described below.

Hereinafter, a lid according to an embodiment of the present invention will be described with reference to FIGS. 1 to 3 together with a container body. FIG. 1 is a side view showing a state in which a cup-shaped container body 11 is covered with a lid 12 according to an embodiment of the present invention. Note that FIG. 1 shows a partially cut-away view of the structures of the lid 12 and the container body 11. FIG. 2 is a plan view showing the structure of the lid 12. FIG. 3 is an enlarged cross-sectional view showing a fitting portion between the lid 12 and the container body 11.

As shown in FIG. 1, the lid 12 covers the container body 11 to form a container 1. The container 1 contains a content such as a beverage. Herein, the content may be a hot beverage such as hot coffee or a cold beverage such as iced coffee. For example, the container 1 is used for services that provide beverages and the like in stores such as a convenience store and a coffee shop.

As shown in FIG. 1, the container body 11 is a cup-shaped drinking container. For example, the container body 11 is formed from a paper base material or a resin material such as a biodegradable resin. In the present embodiment, the container body 11 will be described using a paper cup formed from a paper base material as an example. As shown in FIG. 1, the container body 11 includes a trunk portion 21 and a bottom portion 22.

The trunk portion 21 has a shape of a cylinder with one end provided with the bottom portion 22 and the other end having an opening. The trunk portion 21 gradually increases in diameter from the one end toward the other end having the opening. For example, the trunk portion 21 is formed by turning a rectangular or fan-shaped paper base material into a cylinder and bonding its opposing ends together in an overlapping manner. Thus, the trunk portion 21 has a seam 21*a* due to the two overlapped ends of the paper base material being bonded to each other.

The trunk portion 21 also has a curl portion 21*b* forming a mouth portion at the opening end (i.e., the other end). The curl portion 21*b* is a so-called "top curl" formed by curling the end of the trunk portion 21. The curl portion 21*b* is annularly formed. The curl portion 21*b* protrudes outward from the outer circumferential surface of the end of the trunk portion 21. The curl portion 21*b* is wound several times so as to have a substantially circular cross section.

The bottom portion 22 is provided at one end of the trunk portion 21. The bottom portion 22 is positioned slightly inside the trunk portion 21 with respect to one end of the trunk portion 21, and bonded to the trunk portion 21 as an integral part. The bottom portion 22 closes one end of the trunk portion 21.

The lid 12 is a so-called "lid". As shown in FIG. 1, the lid 12 is detachably fitted to the curl portion 21*b* of the container body 11. As shown in FIGS. 1 to 3, the lid 12 includes a top plate portion 31, a peripheral wall portion 32, a fitting portion 33, and a skirt portion 34. The lid 12 is formed by molding a sheet-like resin material into the top plate portion 31, the peripheral wall portion 32, the fitting portion 33, and the skirt portion 34 as an integral part. As described above, the resin material forming the lid 12 is formed from a biodegradable resin having a specific composition. The resin material is prepared in the form of a rolled sheet, and the rolled sheet is molded to form the lid 12.

As shown in FIG. 2, the top plate portion 31 has a surface shape that is appropriately set to a flat shape, an uneven shape, or the like according to design preference, usability such as easiness of drinking, etc. The top plate portion 31 includes, for example, a score 41, a hinge portion 42, a small hole 43, a locking portion 44, and a locked portion 45.

The score 41 is provided along a part of the region where a beverage passage portion for discharging a content is located. The score 41 is arranged at a part of the top plate portion 31 on the peripheral wall portion 32 side. The score 41 is a slit provided in the top plate portion 31. The score 41 forms a beverage passage portion serving as a drinking spout in the top plate portion 31 by turning about the hinge portion 42 in a direction in which the region of the top plate portion 31 surrounded by the score 41 moves away from the outer surface of another region of the top plate portion 31. The shape of the score 41 can be suitably set, so that it can form the beverage passage portion. In the example of the present embodiment, the score 41, for example, surrounds a trapezoidal region together with the hinge portion 42, wherein the score 41 forms the short side and the inclined sides and the hinge portion 42 forms the long side, as illustrated in FIG. 2.

The hinge portion 42 is linearly provided between both ends of the score 41. For example, the hinge portion 42 is formed of a recess or a step provided to the top plate portion 31. The hinge portion 42 forms a rotation axis of the portion surrounded by the score 41.

The small hole 43 is a through hole provided in the top plate portion 31. The small hole 43 has an opening area capable of releasing the air in the container 1 so as to reduce the internal pressure increased by heating the air in the container 1 in a state where the lid 12 is attached to the container body 11 containing a warm content such as hot coffee.

As shown in FIG. 2, the locking portion 44 is a protrusion provided in a region surrounded by the score 41. As shown in FIG. 2, the locked portion 45 is a recess provided at a position symmetrical to the locking portion 44 with respect to the hinge portion 42. The locked portion 45 is formed in a shape that allows the locking portion 44 to be fitted thereto.

As shown in FIGS. 1 to 3, one end of the peripheral wall portion 32 is continuous with the outer peripheral edge of the top plate portion 31, and the other end of the peripheral wall portion 32 is continuous with the fitting portion 33. For example, the peripheral wall portion 32 is formed in a cylindrical shape gradually decreasing in diameter from the fitting portion 33 side toward the top plate portion 31 side. The other end of the peripheral wall portion 32 has an annular plate portion 32*a* that extends in a direction orthogonal to the axial direction and is continuous with the fitting portion 33.

As shown in FIGS. 1 to 3, the fitting portion 33 is formed in an annular shape, and the inner surface shape thereof is formed in substantially the same shape as the outer surface shape of the curl portion 21*b* of the container body 11. The fitting portion 33 is fitted to the curl portion 21*b* of the container body 11.

The skirt portion 34 is integrally provided at the outer end of the fitting portion 33. The skirt portion 34 is formed in a cylindrical shape increasing in diameter from the upper side to the lower side. The skirt portion 34 has multiple protrusions 34*a* provided along the circumferential direction. The multiple protrusions 34*a* are provided on the skirt portion 34 at predetermined equal intervals in the circumferential direction of the skirt portion 34. The protrusions 34*a* extend along the circumferential direction of the skirt portion 34.

3. Method for Manufacturing Lid

Next, a method for manufacturing the lid 12 will be described with reference to FIG. 4.

First, a rolled sheet formed from a biodegradable resin is fed along a conveying path by a feeding apparatus (step ST1). Then, the conveyed sheet is heated by a heater of a pressure molding apparatus (step ST2).

Next, mold clamping of the sheet is performed by moving the upper mold and the pressure box (lower mold) of the pressure molding apparatus to the molding position (step ST3). Then, vacuum-pressure molding of the sheet is performed by vacuum-drawing the sheet through the upper mold using a vacuum pump of the pressure molding appa-ratus and pressure-blowing the sheet through the pressure box (lower mold) using a compressor of the pressure mold-ing apparatus (step ST4). Thereby, multiple shapes of the lid 12 excluding the score 41 and the small hole 43 are formed on the sheet.

Next, mold opening is performed by moving the upper mold and the pressure box (lower mold) to the standby position (step ST5). Then, punching is performed by push-ing, by a predetermined pushing amount, multiple score cutters and multiple pilot punches into the sheet on which the multiple shapes of the lid 12 are formed (step ST6). The punching herein means molding of the score 41 and molding of the small hole 43. Accordingly, the score 41 and the small hole 43 are formed in the predetermined portion of the sheet where the multiple shapes of the lid 12 are formed.

Next, trimming is performed to punch out multiple lids 12 from the sheet on which the multiple shapes of the lid 12 are formed by moving a pair of punching blades to the punching position (step ST7). Accordingly, each lid 12 is cut from the sheet in the shape of the end of the skirt portion 34, and collected. Then, the collected lids 12 are subjected to post-processing such as inspection and packaging (step ST8).

4. Preferred Embodiments

Hereinafter, preferred embodiments will be shown together.

<1> A lid for covering a cup-shaped drinking container, a resin forming the lid being a biodegradable resin, 50% by mass or more of the biodegradable resin having a deflection temperature under load of 80° C. or more, 5% by mass or more of the biodegradable resin having a flexural elastic modulus of 3000 MPa or more.

<2> The lid according to <1>, wherein the deflection temperature under load is 120° C. or less.

<3> The lid according to <1> or <2>, wherein the flexural elastic modulus is 6000 MPa or less.

<4> The lid according to any one of <1> to <3>, wherein 55% by mass or more, preferably 60% by mass or more, and more preferably 65% by mass or more of the biodegradable resin has a deflection temperature under load of 80° C. or more.

<5> The lid according to any one of <1> to <4>, wherein 10% by mass or more of the biodegradable resin has a flexural elastic modulus of 3000 MPa or more.

<6> The lid according to <1>, wherein the biodegradable resin includes a first resin having a deflection tempera-ture under load of 80° C. or more and a second resin having a flexural elastic modulus of 3000 MPa or more, a proportion of the first resin in the biodegradable resin being in a range of 50 to 95% by mass, and a proportion of the second resin in the biodegradable resin being in a range of 5 to 50% by mass.

<7> The lid according to <1>, wherein the biodegradable resin includes a first resin having a deflection tempera-ture under load of 80° C. or more and a flexural elastic modulus of less than 3000 MPa, and a second resin having a flexural elastic modulus of 3000 MPa or more and a deflection temperature under load of less than 80° C., a proportion of the first resin in the biodegradable resin being in a range of 50 to 95% by mass, and a proportion of the second resin in the biodegradable resin being in a range of 5 to 50% by mass.

<8> The lid according to <1>, wherein the biodegradable resin is formed from two types of resins that are a first resin having a deflection temperature under load of 80° C. or more and a second resin having a flexural elastic modulus of 3000 MPa or more, a proportion of the first resin in the biodegradable resin being in a range of 50 to 95% by mass, and a proportion of the second resin in the biodegradable resin being in a range of 5 to 50% by mass.

<9> The lid according to <1>, wherein the biodegradable resin is formed from two types of resins that are a first resin having a deflection temperature under load of 80° C. or more and a flexural elastic modulus of less than 3000 MPa, and a second resin having a flexural elastic modulus of 3000 MPa or more and a deflection tem-perature under load of less than 80° C., a proportion of the first resin in the biodegradable resin being in a range of 50 to 95% by mass, and a proportion of the second resin in the biodegradable resin being in a range of 5 to 50% by mass.

<10> The lid according to any one of <6> to <9>, wherein the deflection temperature under load of the first resin is 120° C. or less.

<11> The lid according to any one of <6> to <10>, wherein the deflection temperature under load of the first resin is 80 to 120° C., preferably 90 to 120° C., more preferably 90 to 110° C., and still more preferably 90 to 100° C.

<12> The lid according to any one of <6> to <11>, wherein the first resin has a flexural elastic modulus of 400 MPa or more and less than 3000 MPa.

<13> The lid according to any one of <6> to <12>, wherein the flexural elastic modulus of the second resin is 6000 MPa or less.

<14> The lid according to any one of <6> to <13>, wherein the flexural elastic modulus of the second resin is 3000 to 6000 MPa, preferably 3000 to 5000 MPa, and more preferably 3000 to 4000 MPa.

<15> The lid according to any one of <6> to <14>, wherein the second resin has a deflection temperature under load of 40° C. or more and less than 80° C.

<16> The lid according to any one of <6> to <15>, wherein a proportion of the first resin in the biodegrad-able resin is in a range of 55 to 95% by mass, and a proportion of the second resin in the biodegradable resin is in a range of 5 to 45% by mass.

<17> The lid according to any one of <6> to <15>, wherein a proportion of the first resin in the biodegrad-able resin is in a range of 60 to 95% by mass, and a proportion of the second resin in the biodegradable resin is in a range of 5 to 40% by mass.

<18> The lid according to any one of <6> to <15>, wherein a proportion of the first resin in the biodegrad-able resin is in a range of 65 to 95% by mass, and a proportion of the second resin in the biodegradable resin is in a range of 5 to 35% by mass.

<19> The lid according to any one of <6> to <15>, wherein a proportion of the first resin in the biodegrad-able resin is in a range of 50 to 90% by mass, and a proportion of the second resin in the biodegradable resin is in a range of 10 to 50% by mass.

<20> The lid according to any one of <6> to <15>, wherein a proportion of the first resin in the biodegrad-able resin is in a range of 55 to 90% by mass, and a proportion of the second resin in the biodegradable resin is in a range of 10 to 45% by mass.

<21> The lid according to any one of <6> to <15>, wherein a proportion of the first resin in the biodegrad-able resin is in a range of 60 to 90% by mass, and a proportion of the second resin in the biodegradable resin is in a range of 10 to 40% by mass.

<22> The lid according to any one of <6> to <15>, wherein a proportion of the first resin in the biodegradable resin is in a range of 65 to 90% by mass, and a proportion of the second resin in the biodegradable resin is in a range of 10 to 35% by mass.

<23> The lid according to any one of <6> to <22>, wherein the first resin has a tensile breaking elongation of 20% or more.

<24> The lid according to <23>, wherein the tensile breaking elongation is 1000% or less.

<25> The lid according to <23> or <24>, wherein the tensile breaking elongation is 50% or more, preferably 100% or more, more preferably 150% or more, still more preferably 200% or more, still more preferably 300% or more, still more preferably 400% or more, and still more preferably 500% or more.

<26> The lid according to any one of <23> to <25>, wherein the tensile breaking elongation is 50 to 1000%, preferably 100 to 1000%, more preferably 150 to 1000%, still more preferably 200 to 1000%, still more preferably 300 to 1000%, still more preferably 400 to 1000%, and still more preferably 500 to 1000%.

<27> The lid according to any one of <6> to <26>, wherein the first resin is polybutylene succinate or poly(hydroxybutyrate/hydroxyhexanoate).

<28> The lid according to any one of <6> to <27>, wherein the first resin is polybutylene succinate.

<29> The lid according to any one of <6> to <28>, wherein the second resin is polylactic acid.

<30> The lid according to any one of <1> to <29>, wherein the lid has a thickness of 0.03 mm or more in all portions thereof.

<31> The lid according to any one of <1> to <30>, wherein the lid has a thickness of 0.03 to 0.50 mm in all portions thereof, preferably a thickness of 0.03 to 0.45 mm in all portions thereof.

<32> The lid according to any one of <1> to <31>, wherein the lid has a mechanism that is repeatedly openable and closable by a hinge portion provided on a top plate portion.

<33> A container including: the lid according to any one of <1> to <32>; and a cup-shaped container body detachably fitted to the lid.

EXAMPLES (Manufacturing of Lid)

The lid shown in FIGS. 1 to 3 was manufactured using resin mixtures as resin materials, with a ratio (mass ratio) between polybutylene succinate (PBS) and polylactic acid (PLA) varied among the resin mixtures as follows:

Example 1 PBS:PLA=100:0

Example 2 PBS:PLA=90:10

Example 3 PBS:PLA=70:30

Example 4 PBS:PLA=0:100

The PBS used has a deflection temperature under load of 90 to 100° C., a tensile breaking elongation of 500 to 700%, and a flexural elastic modulus of 500 to 700 MPa. The PLA used has a flexural elastic modulus of 3000 to 4000 MPa, a deflection temperature under load of 50 to 60° C., and a tensile breaking elongation of 15% or less.

As described above, the lid was manufactured by forming the outer shape of the lid through vacuum-pressure molding, and then forming a drinking spout and an air hole by molding a score and a small hole.

(Evaluation Method)

"Shape stability against heat", "shape stability against attaching and detaching operations", and "hinge suitability" were evaluated. A container body formed from a paper base material (GDNC09AR manufactured by DIXIE JAPAN LTD.) was used.

The "shape stability against heat" was evaluated as follows. First, 195±3 g of a test liquid (hot coffee liquid) at 95° C. was poured into the container body, and the lid was fitted thereto to prepare a container containing the test liquid. The container containing the test liquid was held for 15 seconds in a state of being tilted at 45° with respect to the direction of gravity. Then, it was visually evaluated whether or not the shape of the lid was impaired and whether or not the test liquid leaked. When the shape of the lid was impaired or the test liquid leaked, the evaluation result was x. When no such problem was observed, the evaluation result was ○.

The "shape stability against attaching and detaching operations" was evaluated as follows. The evaluation was performed by five randomly selected panelists. Each panelist performed attaching and detaching operations twice on one sample. A set of attaching and detaching operations consists of an operation of fitting the lid to the container body and an operation of thereafter removing the lid from the container body. After the attaching and detaching operations were performed twice, it was visually evaluated whether or not deformation such as buckling occurred in the lid. When deformation such as buckling occurred in the lid, the evaluation result was x. When no such problem was observed, the evaluation result was ○.

The "hinge suitability" was evaluated as follows. An empty container body was fitted with the lid and allowed to stand overnight in a temperature-controlled room at 5° C. Then, opening and closing operations of the mechanism that can be opened and closed by the hinge portion were repeated five times in a temperature-controlled room at 5° C. A set of opening and closing operations consists of an operation of opening the score by turning it by about 180° C. with respect to the hinge portion and an operation of thereafter closing it to the original position. After the opening and closing operations were performed five times, it was visually evaluated whether or not cracking or breakage occurred in the hinge portion. When cracking or breakage occurred in the hinge portion, the evaluation result was x. When no such problem was observed, the evaluation result was ○.

(Evaluation Results)

The evaluation results are shown in Table 1.

TABLE 1

| | Composition ratio | | Evaluation Results | | |
| --- | --- | --- | --- | --- | --- |
| | | | Shape stability against heat | Shape stability against attaching and detaching operations | Hinge suit-ability |
| | PBS | PLA | | | |
| Example 1 | 100 | 0 | ○ | x | ○ |
| Example 2 | 90 | 10 | ○ | ○ | ○ |
| Example 3 | 70 | 30 | ○ | ○ | ○ |
| Example 4 | 0 | 100 | x | ○ | x |

The results shown in Table 1 demonstrate that a combination of 50% by mass or more of PBS and 5% by mass or more of PLA can produce a lid having excellent shape stability against heat and attaching and detaching operations and excellent bending resistance of the hinge portion. In these examples, lids having a mechanism that can be repeatedly opened and closed by a hinge portion were manufactured; however, if a lid having no such mechanism is to be manufactured, a combination of 50% by mass or more of PBS and 5% by mass or more of PLA can produce a lid having excellent shape stability against heat and attaching and detaching operations.

The results shown in Table 1 also demonstrate that PBS contributes to the property of not being easily deformed by heat (i.e., heat resistance) and the property of not being easily broken by the bending operation of the hinge portion (i.e., bending resistance), and that PLA contributes to the property of not being easily deformed by the attaching and detaching operations (i.e., strength). The heat resistance of a resin can be represented by an index called "deflection temperature under load", the bending resistance of a resin can be represented by an index called "tensile breaking elongation", and the strength of a resin can be represented by an index called "elastic modulus". "Flexural elastic modulus" is known as a stable index representing the strength of a resin.

Therefore, the results demonstrate that if 50% by mass or more of the biodegradable resin has a deflection temperature under load of 80° C. or more, and 5% by mass or more of the biodegradable resin has a flexural elastic modulus of 3000 MPa or more, it is possible to manufacture a lid having excellent shape stability against heat and attaching and detaching operations and excellent bending resistance of the hinge portion. In these examples, lids having a mechanism that can be repeatedly opened and closed by a hinge portion were manufactured; however, if a lid having no such mechanism is to be manufactured, setting 50% by mass or more of the biodegradable resin to have a deflection temperature under load of 80° C. or more and 5% by mass or more of the biodegradable resin to have a flexural elastic modulus of 3000 MPa or more can produce a lid having excellent shape stability against heat and attaching and detaching operations.

REFERENCE SIGNS LIST

1 . . . Container, 11 . . . Container body, 12 . . . Lid, 21 . . . Trunk portion, 21a . . . Seam, 21b . . . Curl portion, 22 . . . Bottom portion, 31 . . . Top plate portion, 32 . . . Peripheral wall portion, 32a . . . Annular plate portion, 33 . . . Fitting portion, 34 . . . Skirt portion, 34a . . . Protrusion, 41 . . . Score, 42 . . . Hinge portion, 43 . . . Small hole, 44 . . . Locking portion, 45 . . . Locked portion

What is claimed is:

1. A lid for covering an opening end of a cup-shaped drinking container and configured to be detachably fit to the cup-shaped drinking container having a curl portion at the opening end, the lid comprising:
   a disk-shaped top plate portion; and
   a cylindrical portion configured to detachably fit to the curl portion, the cylindrical portion being integral with the top plate portion along an entire periphery of the top plate portion,
   a resin forming the lid being a biodegradable resin, 50% by mass or more of the biodegradable resin having a deflection temperature under load of 80° C. or more, 5% by mass or more of the biodegradable resin having a flexural elastic modulus of 3000 MPa or more,
   the lid including the top plate portion and the cylindrical portion being constituted by one component.

2. The lid according to claim 1, wherein the lid has a thickness of 0.03 mm or more in all portions thereof.

3. The lid according to claim 1, wherein the lid has a mechanism that is repeatedly openable and closable by a hinge portion provided on the top plate portion.

4. The lid according to claim 1, wherein the biodegradable resin includes a first resin having a deflection temperature under load of 80° C. or more and a second resin having a flexural elastic modulus of 3000 MPa or more, a proportion of the first resin in the biodegradable resin being in a range of 50 to 95% by mass, and a proportion of the second resin in the biodegradable resin being in a range of 5 to 50% by mass.

5. The lid according to claim 4, wherein the first resin has a tensile breaking elongation of 20% or more.

6. The lid according to claim 5, wherein the first resin is polybutylene succinate.

7. The lid according to claim 6, wherein the second resin is polylactic acid.

8. The lid according to claim 5, wherein the second resin is polylactic acid.

9. The lid according to claim 4, wherein the first resin is polybutylene succinate.

10. The lid according to claim 9, wherein the second resin is polylactic acid.

11. The lid according to claim 10, wherein the lid has a thickness of 0.03 mm or more in all portions thereof.

12. The lid according to claim 10, wherein the lid has a mechanism that is repeatedly openable and closable by a hinge portion provided on the top plate portion.

13. The lid according to claim 4, wherein the second resin is polylactic acid.

14. The lid according to claim 4, wherein the lid has a thickness of 0.03 mm or more in all portions thereof.

15. The lid according to claim 4, wherein the lid has a mechanism that is repeatedly openable and closable by a hinge portion provided on the top plate portion.

* * * * *